United States Patent [19]

Kumar

[11] Patent Number: 4,623,118
[45] Date of Patent: Nov. 18, 1986

[54] PROPORTIONAL CONTROL VALVE

[75] Inventor: Viraraghavan S. Kumar, Waterloo, Iowa

[73] Assignee: Deere & Company, Moline, Ill.

[21] Appl. No.: 798,357

[22] Filed: Nov. 15, 1985

Related U.S. Application Data

[63] Continuation of Ser. No. 474,859, Aug. 5, 1982, abandoned.

[51] Int. Cl.$^4$ .............................................. F16K 31/42
[52] U.S. Cl. ................................. 251/30.01; 251/38; 251/129.08; 251/129.15
[58] Field of Search .................................. 91/454, 459; 137/596.16; 251/30, 38, 43, 129.08, 129.15, 65

[56] References Cited

U.S. PATENT DOCUMENTS

| | | | |
|---|---|---|---|
| 3,114,532 | 12/1963 | Gray et al. .............................. | 251/30 |
| 3,709,639 | 1/1973 | Suda et al. ........................... | 417/493 |
| 3,893,471 | 7/1975 | Byers, Jr. .............................. | 137/106 |
| 4,147,180 | 4/1979 | Steele, Jr. ........................ | 137/599.2 |
| 4,174,824 | 11/1979 | Kolze ..................................... | 251/30 |
| 4,194,719 | 3/1980 | Ewald et al. .......................... | 251/30 |
| 4,201,052 | 5/1980 | Breeden et al. ....................... | 60/445 |
| 4,300,873 | 11/1981 | Mowbray et al. .................... | 417/416 |
| 4,318,332 | 3/1982 | Shingu et al. ......................... | 91/454 |
| 4,416,187 | 11/1983 | Nyström .............................. | 91/454 |

FOREIGN PATENT DOCUMENTS 332608 11/1958 Switzerland .......................... 251/43

OTHER PUBLICATIONS

"Fluid Power Control", The M.I.T. Press, Massachusetts Institute of Technology, Cambridge, Mass., Copyright 1960, p. 243.
"Development of a High Pressure Load Sensing Mobile Valve", by Robert H. Breeden, Copyright 1981, Society of Automotive Engineers, Inc.
"Cartridge Check Valves: New Option for Hydraulic Control", Machine Design, Dec. 11, 1980, pp. 143-147.

Primary Examiner—Robert E. Garrett
Assistant Examiner—John M. Husar

[57] ABSTRACT

A proportional control valve is described having a housing with a bore formed therein. The first valve contains passages therein which communicate between the fluid inlet and the fluid outlet. Also positioned within the bore is a second valve which is aligned with one of the passages formed in the first valve. As the second valve is moved to a closed position, fluid flow through the passage is cut off and as the second valve is opened, fluid flow through the passage is permitted. A sleeve is also positioned within the bore which is constructed of a non-magnetic section sandwiched between two magnetic end sections. The sleeve contacts the first valve and is formed such that the non-magnetic section surrounds a portion of the second valve. The proportional control valve also contains an electromagnet for linearly moving the second valve in response to an input signal. Movement of the second valve creates a fluid flow path across the first valve and establishes a pressure differential which causes the first valve to follow the movement of the second valve. Likewise, movement of the first valve causes the sleeve to move in a like direction thereby providing an essentially constant air gap between the upper surface of the second valve and the end of the sleeve. This constant air gap is beneficial in that it permits the stroke of the first valve to be increased without increasing the power input to the electromagnet.

1 Claim, 5 Drawing Figures

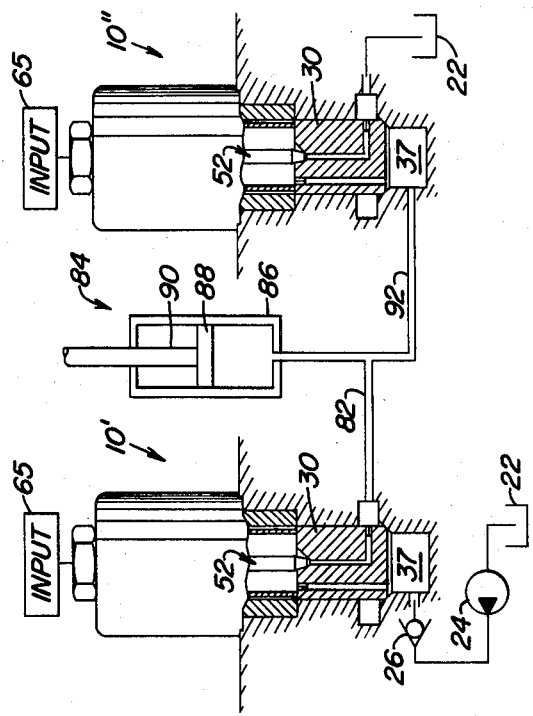
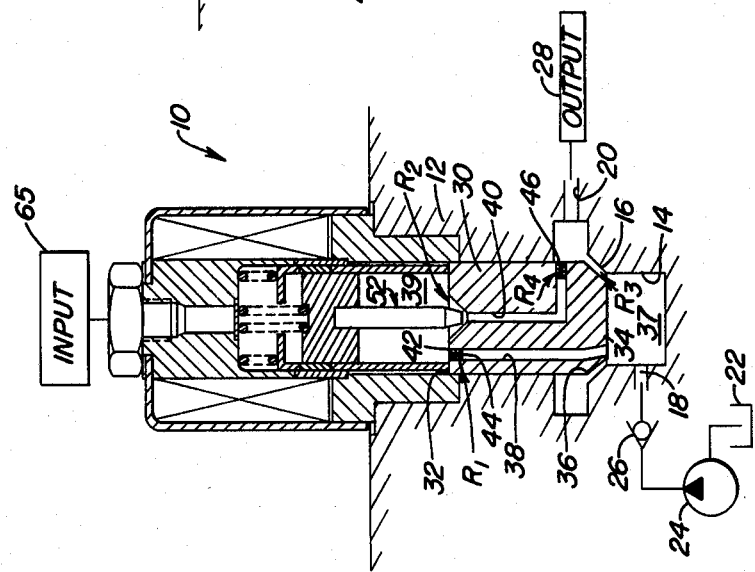
FIG. 4
FIG. 3

PROPORTIONAL CONTROL VALVE

This is a continuation of application Ser. No. 474,859, filed 8/5/82, now abandoned.

This invention relates to a proportional control valve for regulating fluid flow between two functions.

BACKGROUND OF THE INVENTION

Various types of proportional control valves exist which use multiple valves which are electromagnetically actuated. Examples of such are described in U.S. Pat. No. 3,893,471 issued to Byers, Jr.; and U.S. Pat. No. 4,300,873 issued to Mowbray et al. In these types of proportional control valves, the force which can be developed by a given size solenoid is inversely proportional to the air gap across which the magnetic flux must jump for any given current. The prior art valves have modified the magnetic characteristics to obtain a constant force over a wide air gap thereby producing a linear relationship between input current and valve stroke. By doing so, the effect of the air gap is minimized and the maximum useable force level is sacrificed. This means that the valve stroke and thus the flow capacity of the valve can only be increased by increasing the power input to the valve, which is not feasible in many instances.

Now, a proportional control valve has been invented which utilizes an essentially constant and small air gap across which a magnetic flux crosses such that an increased force is obtainable there increasing the length of stroke of the valve.

SUMMARY OF THE INVENTION

Briefly, this invention relates to a proportional control valve having a housing with a bore formed therein and having a fluid inlet and a fluid outlet communicating with the bore. Positioned within the bore are first and second valves, with the first valve located between the fluid inlet and the fluid outlet. The first valve has passages formed therein to permit fluid flow across it and is movable between a closed position block flow from the inlet to the outlet and an open position permitting fluid flow from the inlet to the outlet. The second valve is positioned above the first valve and is aligned with one of the passages formed in the first valve. The second valve is also movable between a closed position blocking fluid flow through the aligned passage and an open position permitting fluid flow therethrough. Surrounding the second valve and contacting an upper portion of the first valve is a sleeve having a magnetic end section which is axially spaced apart from an upper surface of the second valve and a nonmagnetic section which surrounds a portion of the second valve. The control valve also includes an electromagnetic member for linearly moving the second valve. As the second valve moves upward, a flow path is formed from the fluid inlet through the first valve to the fluid outlet. This flow path establishes a pressure differential across the first valve which causes the first valve to follow the upward movement of the second valve. As the first valve moves upward, the sleeve moves in a like direction thereby providing an essentially constant air gap between the upper surface of the second valve and the end of the sleeve. By maintaining a constant air gap, the stroke of the first valve can be increased without increasing the power input to the electromagnetic member.

The general object of this invention is to provide a proportional control valve for regulating fluid flow between two functions. A more specific object of this invention is to provide a proportional control valve which utilizes an essentially constant and small air gap across which a magnetic flux crosses, such that an increased force is obtainable thereby increasing the length of stroke of the valve.

Another object of this invention is to provide a proportional control valve having a pair of interacting poppet members which exhibit a position feedback characteristic.

Still another object of this invention is to provide a proportional control valve which is less prone to contamination than conventional spool valves.

Still further, an object of this invention is to provide a proportional control valve which is easy to manufacture and economical to build.

Other objects and advantages of the present invention will become more apparent to those skilled in the art in view of the following description and the accompanying drawings.

BRIEF DESCRIPTION OF THE DRAWINGS

FIG. 3 is a schematic view of the proportional control valve showing both valves in a raised position.

FIG. 4 is a schematic view of a three-way proportional control valve using two valve cartridges for controlling the movement of a load therebetween.

DETAILED DESCRIPTION OF THE PREFERRED EMBODIMENT

Figure 2:
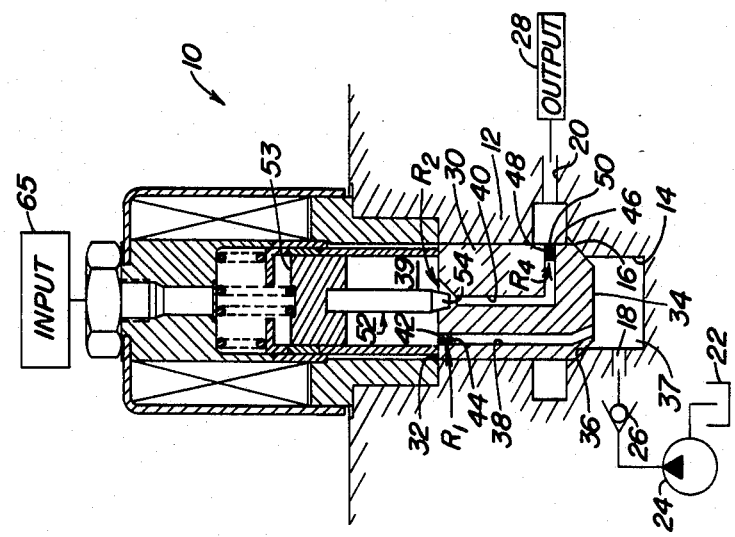
FIG. 2 is a schematic view of the proportional control valve showing the top valve in a raised position.
Figure 1:
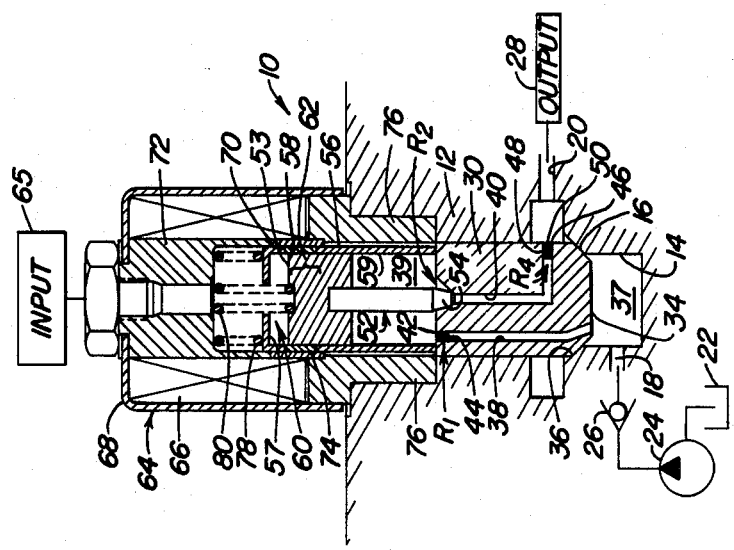
FIG. 1 is a schematic view of the proportional control valve having an essentially constant air gap across which the magnetic flux crosses and having a pair of valves both shown in a down or closed position.

Referring to FIGS. 1-3, a proportional control valve 10 is shown having a housing 12 with a bore 14 formed therein. Formed on an inner surface of the bore 14 is a valve seat 16. Communicating with the bore 14 is a fluid inlet 18 and a fluid outlet 20. The fluid inlet 18 is connected to a fluid reservoir 22 by a fluid pump 24 and a check valve 26. The fluid outlet 20, on the other hand, is connected to an output function 28. In an agricultural or industrial vehicle, the output function 28 could be one or more hydraulic cylinders or motors which raise or lower an attached implement.

Positioned within the bore 14 between the fluid inlet 18 and the fluid outlet 20 is a first valve 30, preferably a poppet valve. The first valve 30 has a top surface 32 and a bottom surface 34. A lower peripheral surface 36 on the first valve 30 is mateable with the valve seat 16. Preferably, the net effective area of the bottom surface 34 over which a pressurized fluid can act, is approximately equal to the net effective area of the top surface 32 over which a pressurized fluid can act. The importance of having approximately equal net effective areas on both the top and bottom surfaces, 32 and 34 respectively, will be explained shortly when describing the operation of the proportional control valve 10. The first valve 30 divides the bore 14 into two spaced apart cavities, denoted as a supply cavity 37 and a control cavity 39. The supply cavity 37 is located below the bottom surface 34 of the first valve 30 while the control cavity 39 is located above the top surface 32 of the first valve 30.

Formed within the first valve 30 is a first fluid passage 38 and a second fluid passage 40. The first fluid passage 38 extends from the top surface 32 to the bottom surface 34 and functions as a restriction $R_1$ there between to create a pressure drop across the first valve 30. In order to obtain a more desirable pressure drop for different pressure valves, a plug 42 containing a pre-sized orifice 44 can be inserted into the first passage 38. In either case, a pressure drop is created across the first valve 30, with the high pressure generally being present at the bottom surface 34.

The second fluid passage 40 extends from the top surface 32 of the first valve 30 to an exterior point 46 on the first valve 30 which is located between the top and bottom surfaces, 32 and 34 respectively. The exterior point 46 is always in fluid communication with the fluid outlet 20 regardless of the position of the first valve 30 within the bore 14. A plug 48, which contains a pre-sized orifice 50, can also be inserted into the second passage 40 to serve the same function as the plug 42 and creates a restriction denoted $R_4$.

The first valve 30 is movable through a limited range by fluid pressure between a closed position wherein the lower peripheral surface 36 is resting on the valve seat 16 and an open position wherein the lower peripheral surface 36 is spaced apart from the valve seat 16.

A second valve 52, preferably a poppet valve, having a top surface 53 is positioned in the bore 14 adjacent to the top surface 32 of the first valve. The second valve 52 is aligned with the entrance to the second passage 40 and is linearly movable between a closed position blocking fluid flow through the second passage 40 and an open position, as shown in FIG. 2, permitting fluid flow through the second passage 40. The size and configuration of a lower tip 54 of the second valve 52 can be designed such that a flow restriction $R_2$ creates flow forces around the tip 54 to produce a pressure compensated flow control across the entire valve 10.

The proportional control valve 10 also includes a sleeve 56 which is positioned in the bore 14 and contacts the top surface 32 of the first valve 30. The sleeve 56 is constructed of a magnetic end member 57, a non-magnetic tubular section 58 and a magnetic tubular section 59. The magnetic end member 57 is spaced away from the top surface 53 of the second valve 52 such that a small air gap 60 is formed therebetween. This small air gap 60 will stay relatively constant throughout the operation of the valve 10. The non-magnetic tubular section 58 is arranged about a top portion 62 of the second valve 52 so as to permit a magnetic flux produced by an electromagnetic element 64, such as a solenoid, to linearly move the second valve 52 upward when the electromagnetic element 64 is energized by an input signal 65. As is well known to those skilled in the electrical art, the second valve 52 acts as an armature and is pulled upward by the magnetic flux when current is supplied to the electromagnetic element 64.

The electromagnetic element 64 includes a coil 66 which is enclosed by a cap 68. The coil 66 partially encircles a support member 70 which is constructed of a non-magnetic member 74 sandwiched between two magnetic members 72 and 76. The non-magnetic member 74 is radially aligned with the non-magnetic section 58 of the sleeve 56 so as to enable the magnetic flux to form a loop from the coil 66 through the magnetic members 76 and 59, the top portion 62 of the second valve 52, across the air gap 60 and into the magnetic end member 57 of the sleeve 56. By maintaining an essentially constant and small air gap 60 across which the magnetic flux crosses, a larger force can be obtained which will increase the length of stroke of the first valve 30. This translates into an increased flow capacity between the fluid inlet 18 and the fluid outlet 20, denoted as $R_3$ FIG. 3.

Lastly, the proportional control valve 10 contains a pair of springs 78 and 80 which are positioned in the bore 14. The spring 78 urges the sleeve 56 downward against the top surface 32 of the first valve 30 while the spring 80 presses against the top surface 53 of the second valve 52 to constantly urge the second valve 52 downward against the first valve 30. Both of the springs 78 and 80 help assure that the air gap 60 will remain essentially constant at all times. In addition, the spring 78 also assists in urging the first valve 30 back towards it closed position once the pressure differential across the first valve 30 decreases thereby assuring that the first valve 30 will not be stuck in an open or partially open position.

Operation

The operation of the proportional control valve 10 will be described starting with FIG. 1 wherein both the first and second valves, 30 and 52 respectively, are in the down or closed positions. The pressurized fluid from the pump 24 will fill the supply cavity 37, the first passage 38 and the control cavity 39 but since there is no flow path between the fluid inlet 18 and the fluid outlet 20, there will be no pressure drop across the first valve 30. This equilibrium of pressure on the first valve 30 along with the force of the spring 78 will assure that the first valve 30 remains seated against the valve seat 16.

In order to facilitate fluid flow through the valve 10, the electrical input signal 65 is triggered to energize the electromagnetic element 64. The coil 66 of the electromagnetic element 64 then produces a magnetic flux which pulls the second valve 52 upward so that a flow path is established through the second passage 40, see FIG. 2. The amount that the second valve 52 moves upward is directly related to the amount of current supplied to the electromagnetic element 64. It should be noted that the flow path will be from the fluid inlet 18 to the fluid outlet 20. A reverse flow is prevented by the presence of the check valve 26.

As fluid flows out of the control cavity 39, a pressure differential is created across the first valve 30 such that the pressure on the bottom surface 34 is greater than the pressure on the top surface 32. When this pressure difference exceeds the downward biasing force in the spring 78, the first valve 30 will move upward away from the valve seat 16, see FIG. 3. In so doing, the third fluid opening $R_3$ is formed between the fluid inlet 18 and fluid outlet 20. As the first valve 30 moves upward, it moves the sleeve 56 in a like direction so that the air gap 60 will remain essentially constant. The only possible variation in the height of the air gap 60 will occur upon the initial movement of the second valve 52.

In actual operation, the first valve 30, the second valve 52 and the sleeve 56 will move upward and downward simultaneously once a pressure differential is created across the first valve 30. This corresponding linear movement of the two valves, 30 and 52, creates a position feedback characteristic in the proportional control valve 10. The position feedback is a result of the variable orifice $R_2$ which is formed at the entrance to the second passage 40. Should the pressure of the incoming fluid drop, the first valve 30 would move downward due to the reduced pressure impinging on the bottom surface 34. As the first valve 30 moves downward, the size of the opening $R_3$ would decrease thereby restricting the outflow of fluid from the supply cavity 37. At the same time, the size of the variable orifice $R_2$ will increase, thereby decreasing the pressurized force acting on the top surface 32. Almost instantaneously, the first valve 30 will move to an equilibrium position. Such compensating movement is referred to as position feedback and will occur should the second valve 52 be moved or should the pressure across the proportional control valve 10 change.

Alternative Arrangements

The proportional control valve 10 can be combined with one or more control valves to produce multiple control valves, such as three-way and four-way valves. In FIG. 4, two control valves or cartridges designated 10' and 10" have been connected together to form a three-way valve such that the output of the control cartridge 10' is directed by conduit 82 to a function 84. The function 84 is depicted as a hydraulic cylinder 86 having a piston 88 with a piston rod 90 connected to a load. The conduit 82 is also connected to the supply cavity 37 of the control cartridge 10" by a conduit 92. In FIG. 4, both of the control cartridges 10' and 10", have their respective first and second valves 30 and 52 positioned in a down position such that no fluid is permitted to flow through them. The load therefore cannot move the piston 88 because the fluid within the hydraulic cylinder 86 has no place to go. This corresponds to a neutral position. When the first cartridge 10' has its valves 30 and 52 in the open position, such that fluid flow is permitted from the pump 24 through the conduit 82 to the hydraulic cylinder 86 and when the second cartridge 10" has its valves in the closed position, the piston 88 will be moved upwards. Likewise, when the cartridge 10' has its valves 30 and 52 in the closed position and the cartridge 10" has its valves 30 and 52 in an open position, fluid is permitted to flow out of the hydraulic cylinder 86 thereby permitting the piston 88 to move downwards.

Figure 5:
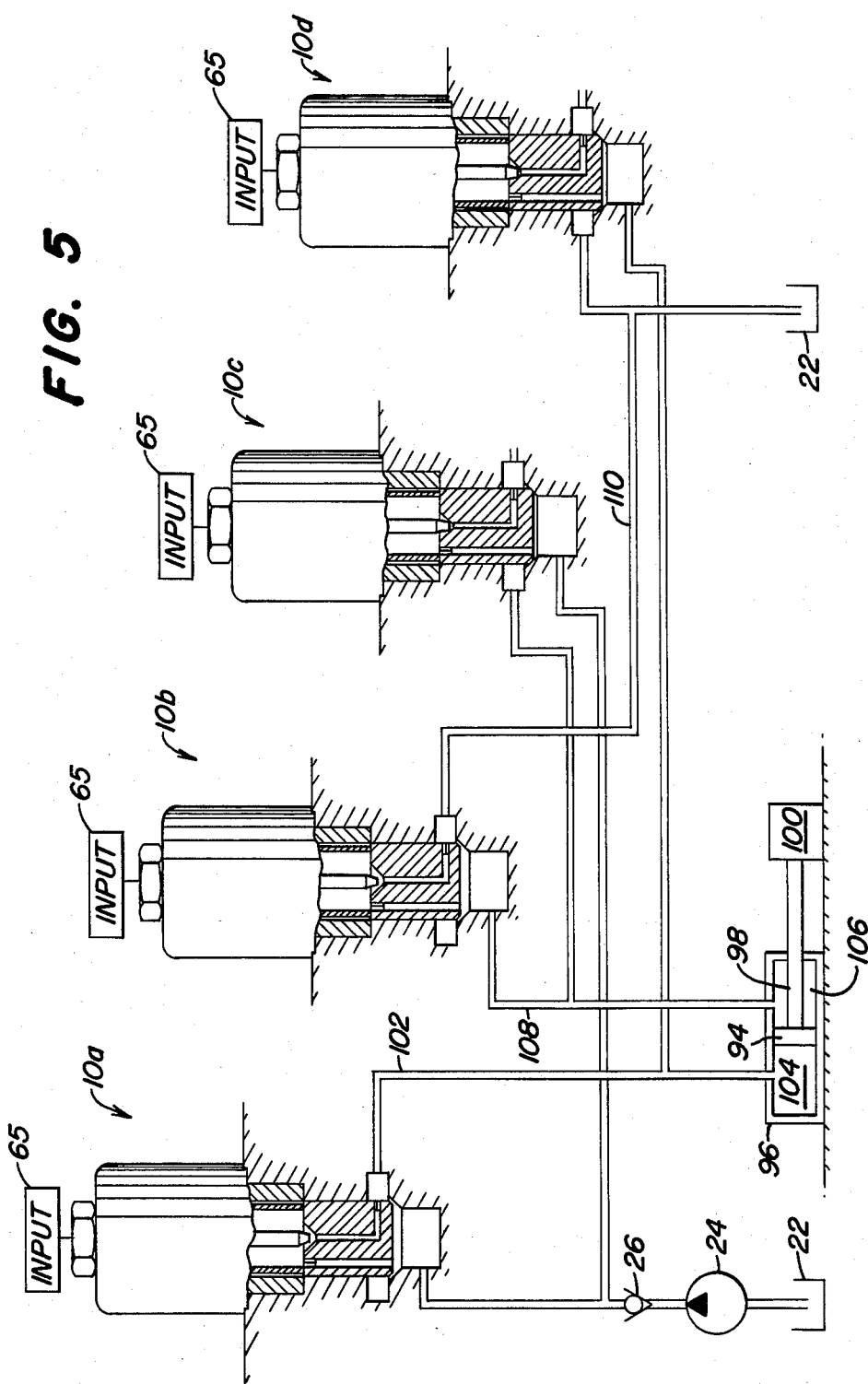
FIG. 5 is a schematic view of a four-way proportional control valve using four valve cartridges.

Turning now to FIG. 5, an example of a four-way control valve is depicted wherein four control valves or cartridges, denoted as 10a, 10b, 10c and 10d, are arranged to actuate a double-acting piston 94. The piston 94 is positioned within a hydraulic cylinder 96 and is connected by a single piston rod 98 to a load 100. In the position shown, the valves within the first cartridge 10a are open permitting pressurized fluid to flow from the pump 24 through a conduit 102 into a chamber 104 which is located on the left-hand side of the piston 94. The valves within the second cartridge 10b are also open such that fluid in a chamber 106, located on the right-hand side of the piston 94, can flow through a conduit 108 and through a return conduit 110 to the reservoir 22. The valves within the cartridges 10c and 10d remain closed during this segment of the cycle but both will be opened when cartridges 10a and 10b are closed to permit the piston 94 to move back to the left. The four-way control valve has four modes, in the first or neutral mode all the valves within the cartridges 10a, 10b, 10c and 10d are closed. In the second mode, that described above, the valves within the cartridges 10a and 10b are open and the valves within the cartridges 10c and 10d are closed, thereby forcing the piston 94 to the right. In the third mode, the valves within the cartridges 10a and 10b are closed and the valves within the cartridges 10c and 10d are open, thereby forcing the piston 94 to the left. And in the fourth or float mode, the valves within the cartridges 10a and 10c are closed and the valves within the cartridges 10b and 10d are open, thereby allowing the piston to move in either direction depending on the pressure differential across the piston 94.

It should be noted that various combinations and arrangements using a plurality of proportional control valves 10 or cartridges are possible.

While this invention has been described in conjunction with a specific embodiment and in two different arrangements, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

I claim:

1. A proportional control valve comprising:

a housing having a valve bore therein, and having a fluid inlet and a fluid outlet communicating with the valve bore;

a first valve member movable in the valve bore in response to fluid pressure to control fluid flow between the inlet and the outlet;

a second valve member movable in the valve bore and cooperating with the first valve member to control fluid pressure acting on the first valve member;

a hollow case;

a magnetic conductive armature fixed with respect to the second valve member and movable within the case;

a coil surrounding the case for generating magnetic flux and thereby moving the armature;

a sleeve assembly movable in the case with the armature and coaxially receiving the armature, the sleeve having a non-magnetic section surrounding a portion of the armature and having a magnetic conductive end section including a radially inwardly extending lip spaced axially apart from the armature by a substantially fixed distance, the lip and the armature comprising magnetic circuit elements separated by a substantially fixed axially extending air gap across which magnetic flux must jump, this air gap being positioned axially within the coil, the axial length of the air gap when the coil is energized being essentially the same as the axial length of the air gap when the coil is de-energized; and resilient means for urging the armature and sleeve in opposition to magnetic forces generated by the coil.

* * * * *